J. M. MARBERRY.
Animal-Traps.

No. 146,601. Patented Jan. 20, 1874.

Witnesses.
P. C. Dieterich
C. Sedgwick

Inventor.
J. M. Marberry
per Munn & Co.
Attorneys.

UNITED STATES PATENT OFFICE.

JOHN M. MARBERRY, OF JOHNSONVILLE, TENNESSEE, ASSIGNOR TO HIMSELF AND JOHN M. PALMER, OF SAME PLACE.

IMPROVEMENT IN ANIMAL-TRAPS.

Specification forming part of Letters Patent No. 146,601, dated January 20, 1874; application filed November 9, 1872.

*To all whom it may concern:*

Figure 1:
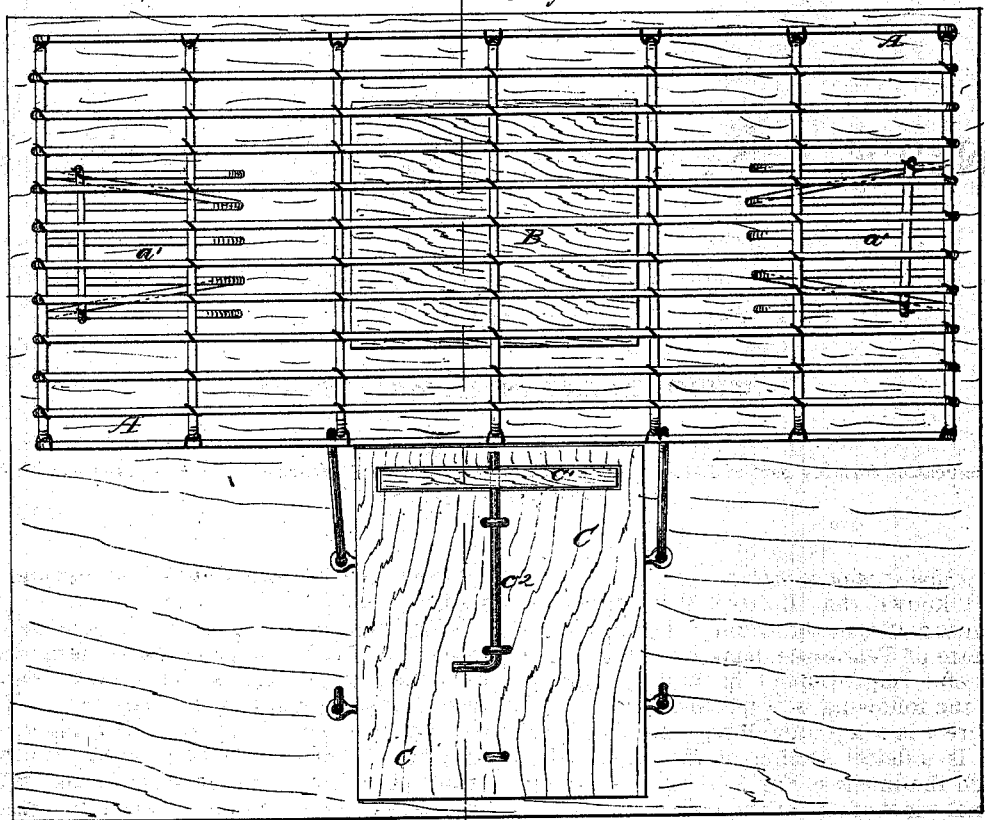
Figure 2:
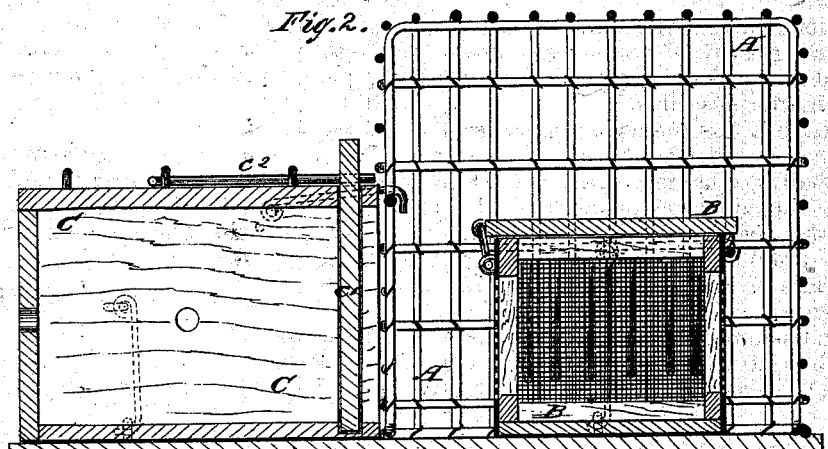
Figure 3:
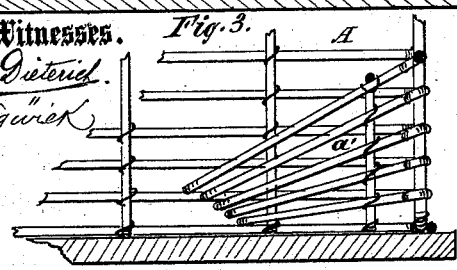

Be it known that I, JOHN M. MARBERRY, of Johnsonville, in the county of Humphreys and State of Tennessee, have invented a new and useful Improvement in Animal-Trap, of which the following is a specification:

Figure 1 is a top view of my improved trap. Fig. 2 is a detail section of the same taken through the line $x\ x$, Fig. 1. Fig. 3 is a detail sectional view of one of the entrances.

Similar letters of reference indicate corresponding parts.

My invention relates to the relative construction and arrangement of a bait-box, prison-chamber, and wire cage for inclosing the former two, as hereinafter described.

The wire cage A has the usual entrances $a$, and is attached to a bottom board, as shown. B is a small bait-box, having wire or wire-cloth sides, and a hinged or removable top. It is secured to the bottom board by hooks and staples. To provide for placing the bait-box within the cage A, and for its removal therefrom, an opening is formed in the side of the latter. This opening is closed by the prison-box C, which is attached to the cage by wire hooks. The box has a vertically-sliding door, $c^1$, which is held either closed or elevated by a sliding bolt, $e^2$.

When the trap is to be put in readiness for catching animals, the prison-box C is detached from the cage A, and the bait-box B removed through the opening thus uncovered. When bait has been put in the box, it is replaced and secured, as before. The prison-box C is then attached to cover the opening in the side of the cage. The animal enters the cage A through the entrances $a'$, and thence passes naturally into the prison-box with a view to concealment. The gate $c^1$ being lowered and secured by the bolt, the box may be removed to a place convenient for dispatching the animal.

What I claim is—

The wire cage A, provided with a side opening, the removable bait-box B, and detachable prison-box C, all constructed and relatively arranged as herein shown and described, for the purpose specified.

JOHN M. MARBERRY.

Witnesses:
HENRY C. CRIM,
FRANCIS M. MARBERRY.